(12) United States Patent
Ravishankar et al.

(10) Patent No.: US 10,856,333 B2
(45) Date of Patent: Dec. 1, 2020

(54) EFFICIENT TRANSPORT OF INTERNET OF THINGS (IOT) TRAFFIC IN TERRESTRIAL WIRELESS AND SATELLITE NETWORKS

(71) Applicant: Hughes Network Systems, LLC, Germantown, MD (US)

(72) Inventors: Channasandra Ravishankar, Clarksburg, MD (US); James Jehong Jong, North Potomac, MD (US); Gaguk Zakaria, College Park, MD (US); Nassir Benammar, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 27 days.

(21) Appl. No.: 16/237,555

(22) Filed: Dec. 31, 2018

(65) Prior Publication Data
US 2020/0100291 A1   Mar. 26, 2020

Related U.S. Application Data

(60) Provisional application No. 62/748,740, filed on Oct. 22, 2018, provisional application No. 62/736,152, filed on Sep. 25, 2018.

(51) Int. Cl.
*H04W 74/08*  (2009.01)
*H04W 52/02*  (2009.01)
(Continued)

(52) U.S. Cl.
CPC .... *H04W 74/0833* (2013.01); *H04B 7/18578* (2013.01); *H04W 52/0235* (2013.01);
(Continued)

(58) Field of Classification Search
CPC ............ H04W 74/0833; H04W 76/10; H04W 52/0235; H04W 72/04; H04W 88/08; H04B 7/18578
See application file for complete search history.

(56) References Cited

U.S. PATENT DOCUMENTS

2016/0374048 A1   12/2016   Griot et al.
2017/0201393 A1    7/2017   Gaal et al.
(Continued)

FOREIGN PATENT DOCUMENTS

WO   WO2014075458 A1   5/2014

OTHER PUBLICATIONS

Andres-Maldonado, et al., "Narrowband IoT Data Transmission Procedures for Massive Machine-Type Communications", IEEE Network, vol. 31, Issue 6, Nov. 27, 2017.
(Continued)

*Primary Examiner* — Eric Myers
(74) *Attorney, Agent, or Firm* — Potomac Technology Law, LLC

(57) ABSTRACT

A data communications system, includes a data communications device (DCD), and at least one wireless access network, which includes a base station. The DCD generates a narrowband message which includes user-plane data of the DCD. The DCD transmits the narrowband message to the base station via a random access control-plane channel of the wireless access network, prior to any request for or establishment of a wireless or radio resource connection, or establishment of any dedicated radio bearers or wireless channels, between the DCD and the base station.

23 Claims, 11 Drawing Sheets

(51) Int. Cl.
     *H04W 76/10*    (2018.01)
     *H04W 72/04*    (2009.01)
     *H04B 7/185*     (2006.01)
     *H04W 88/08*    (2009.01)

(52) U.S. Cl.
     CPC ........... *H04W 72/04* (2013.01); *H04W 76/10* (2018.02); *H04W 88/08* (2013.01)

(56) References Cited

U.S. PATENT DOCUMENTS

| | | |
|---|---|---|
| 2018/0020329 A1 | 1/2018 | Smith |
| 2018/0352593 A1* | 12/2018 | Velev .................... H04W 24/08 |
| 2019/0028860 A1* | 1/2019 | Futaki ................... H04W 88/06 |
| 2019/0037447 A1* | 1/2019 | Lee ....................... H04W 28/18 |
| 2020/0100088 A1* | 3/2020 | Kim ...................... H04W 88/04 |

OTHER PUBLICATIONS

USPTO, "International Search Report and Written Opinion", PCT/US2018/068228, dated Mar. 26, 2019.

\* cited by examiner

US 10,856,333 B2

EFFICIENT TRANSPORT OF INTERNET OF THINGS (IOT) TRAFFIC IN TERRESTRIAL WIRELESS AND SATELLITE NETWORKS

RELATED APPLICATIONS

This application claims the benefit of the earlier filing date under 35 U.S.C. § 119(e) from U.S. Provisional Application Ser. No. 62736152 (filed 2018 Sep. 25) and U.S. Provisional Application Ser. No. 62748740 (filed 2018 Oct. 22), each of which is incorporated by reference herein in its entirety.

FIELD

The present invention relates to IP and Non-IP Internet of Things data traffic in wireless (e.g., terrestrial wireless and satellite) networks.

BACKGROUND

The terrestrial wireless 3GPP-based narrow band Internet of Things (NB-IoT) provides a procedure by which IoT data is transmitted across the wireless air interface between the user via a user terminal (UT) (also referred to as user equipment (UE)) and the cell gateway or eNodeB. Such terrestrial wireless 3GPP-based transmission, however, involves a number of signaling exchanges, which result in various operational disadvantages. Such disadvantages include higher battery usage and power consumption in the UT, increases in the length of time during which the UT must remain ON or Active, reductions in robustness and delays in the transfer of IoT messages (especially in satellite networks, where the exchanges between the UT and gateways may be over relatively long delay satellite links).

What is needed, therefore, are approaches for efficient transmission of Internet Protocol (IP) and Non-IP Internet of Things (IoT) data traffic over the air interface between a user terminal (UT) or user equipment (UE) and eNodeB or gateway in terrestrial wireless and satellite networks.

Some Example Embodiments

The present invention advantageously addresses the foregoing requirements and needs, as well as others, by providing approaches for efficient transmission of Internet Protocol (IP) and Non-IP Internet of Things (IoT) data traffic over the air interface between a user terminal (UT) or user equipment (UE) and eNodeB or gateway in terrestrial wireless and satellite networks, such as by significantly reducing the signaling processes that are normally encountered when IoT data is transmitted over such air interfaces using the methodologies prescribed in terrestrial IoT specifications [see, e.g., 3GPP TS 23.401, 36.300 and 23.682]. Such novel transmission approaches achieve significant advantages over the current methodologies, including (i) saving or conserving network radio resources, (ii) saving or conserving UE battery power and runtime before requiring recharge, (iii) saving or conserving satellite power in satellite systems, (iv) reducing interference, (v) improving robustness, and (vi) improved signaling while maintaining compatibility with existing 4G LTE core network infrastructure equipment.

In accordance with example embodiments of the present invention, a data communications system includes a data communications device (DCD), and at least one wireless access network, which includes a base station. The DCD is configured to generate a narrowband message which includes user-plane data of the DCD. The DCD is configured to transmit the narrowband message to the base station via a random access control-plane channel of the wireless access network, prior to any request for or establishment of a wireless or radio resource connection, or establishment of any dedicated radio bearers or wireless channels, between the DCD and the base station.

According to a further embodiment, the data communications system further includes a network management entity. The base station is configured to generate a DCD message including the user-plane data of the DCD, and to transmit the DCD message to the network management entity.

According to a further embodiment, the data communications system further includes one or more applications servers. The network management entity is configured to generate a DCD server message including the user-plane data of the DCD, and to transmit the DCD server message to at least one of the one or more applications servers.

According to a further embodiment of the data communications system, the DCD is configured to include a message-type flag in the narrowband message which indicates that the narrowband message includes the user-plane data of the DCD, and the base station is configured to distinguish the narrowband message from at least one other message, each received over the random access control-plane channel of the wireless access network from a respective other DCD, which does not include user-plane data of the respective other DCD.

According to a further embodiment of the data communications system, the DCD is configured to include location information in the narrowband message which indicates a current location of the DCD, and to include a DCD location flag in the narrowband message which indicates that the narrowband message includes the location information.

According to a further embodiment of the data communications system, the base station is configured to determine that the narrowband message includes the location information based on the DCD location flag, and to include a location identifier in the DCD message transmitted to the network management entity, wherein the location identifier reflects the current location of the DCD.

According to a further embodiment of the data communications system, the DCD is configured to include a DCD identifier in the narrowband message which is a DCD identity assigned to the DCD during an initial DCD registration procedure, and the base station is configured to include the DCD identifier in the DCD message transmitted to the network management entity, wherein the inclusion of the DCD identifier in the DCD message to the network management entity serves to indicate that the user-plane data included in the DCD message originated from the DCD.

In accordance with further example embodiments of the present invention, a data communications device (DCD) for a data communications system is provided. The DCD includes one or more processors, and a transceiver configured to transmit and receive wireless data communications to and from a base station of the data communications system. The one or more processors is/are configured to generate a narrowband message including user-plane data of the DCD. The one or more processors is/are configured to control the transceiver to transmit the narrowband message to the base station via a random access control-plane channel of a wireless access network of the data communications system, prior to any request for or establishment of a wireless or radio resource connection, or establishment of any dedicated radio bearers or wireless channels, between the DCD and the base station.

According to a further embodiment of the DCD, the one or more processors is/are configured to include a message-type flag in the narrowband message which indicates that the narrowband message includes the user-plane data of the DCD, and the one or more processors is/are configured to include the message-type flag in the narrowband message to enable the base station to distinguish the narrowband message from one or more other messages, which may be received by the base station over the random access control-plane channel of the wireless access network from at least one respective other DCD, and which does not include user-plane data of the at least one respective other DCD.

According to a further embodiment of the DCD, the one or more processors is/are configured to include location information in the narrowband message which indicates a current location of the DCD, and to include a device location flag in the narrowband message which indicates that the narrowband message includes the location information.

According to a further embodiment of the DCD, the one or more processors is/are configured to include a device identifier in the narrowband message which is a device identity assigned to the DCD during an initial registration procedure, and the one or more processors is/are configured to include the device identifier in the narrowband message for use as an identifier to associate the user-plane data included in the DCD message with the DCD.

According to a further embodiment of the DCD, the one or more processors is/are configured to encapsulate the narrowband message in a data-link protocol block message, and the one or more processors is/are configured to include a backlog flag in the narrowband message which indicates whether a transmission buffer of the DCD contains further of the user-plane data of the DCD awaiting transmission to the base station.

According to a further embodiment of the DCD, when the transmission buffer of the DCD contains the further user-plane data of the DCD awaiting transmission to the base station, the one or more processors is/are configured to await receipt, via the transceiver, of an acknowledgment message from the base station. Upon receipt of the acknowledgment message, the one or more processors is/are configured to generate one or more further data-link protocol block messages, each including a respective segment of the further user-plane data of the DCD awaiting transmission to the base station, and a sequence number indicating a relative position of the respective segment with respect to an original configuration of the user-plane data of the DCD, and to control the transceiver to transmit each of the one or more further data-link protocol block messages to the base station.

According to a further embodiment of the DCD, the one or more processors is/are configured to receive, via the transceiver, an uplink resource allocation message from the base station, the one or more processors is/are configured to control the transceiver to transmit each of the one or more further data-link protocol block messages to the base station via wireless uplink resources allocated to the DCD in accordance with the uplink resource allocation message.

According to a further embodiment of the DCD, the one or more processors is/are configured to control the DCD to enter a power-saving mode for a predetermined time period after the transmission of the narrowband message to the base station.

In accordance with further example embodiments of the present invention, a method for data communications in a data communications system is provided. The method includes the steps of generating, by a data communications device (DCD), a narrowband message including user-plane data of the DCD, and transmitting, by the DCD, the narrowband message to a base station via a random access control-plane channel of a wireless access network of the data communications system, prior to any request for or establishment of a wireless or radio resource connection, or establishment of any dedicated radio bearers or wireless channels, between the DCD and the base station.

According to a further embodiment of the method, the narrowband message includes a message-type flag which indicates that the narrowband message includes the user-plane data of the DCD, and the message-type flag is included in the narrowband message to enable the base station to distinguish the narrowband message from one or more other messages, which may be received by the base station over the random access control-plane channel of the wireless access network from at least one respective other DCD, and which does not include user-plane data of the at least one respective other DCD.

According to a further embodiment of the method, the narrowband message includes location information which indicates a current location of the DCD, and includes a device location flag which indicates that the narrowband message includes the location information.

According to a further embodiment of the method, the narrowband message includes a device identifier which is a device identity assigned to the DCD during an initial registration procedure, and the device identifier is included in the narrowband message for use as an identifier to associate the user-plane data included in the DCD message with the DCD.

According to a further embodiment of the method, the narrowband message is encapsulated in a data-link protocol block message, and the narrowband message includes a backlog flag which indicates whether a transmission buffer of the DCD contains further of the user-plane data of the DCD awaiting transmission to the base station.

According to a further embodiment of the method, when the transmission buffer of the DCD contains the further user-plane data of the DCD awaiting transmission to the base station, the method further includes the steps of receiving, by the DCD, an acknowledgment message from the base station, and, upon receipt of the acknowledgment message, generating one or more further data-link protocol block messages, each including a respective segment of the further user-plane data of the DCD awaiting transmission to the base station, and a sequence number indicating a relative position of the respective segment with respect to an original configuration of the user-plane data of the DCD, and transmitting each of the one or more further data-link protocol block messages to the base station.

According to a further embodiment of the method, the method further includes the step of receiving, by the DCD, an uplink resource allocation message from the base station, and transmitting each of the one or more further data-link protocol block messages to the base station via wireless uplink resources allocated to the DCD in accordance with the uplink resource allocation message.

According to a further embodiment of the method, the DCD enters a power-saving mode fora predetermined time period after the transmission of the narrowband message to the base station.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Figure 1:
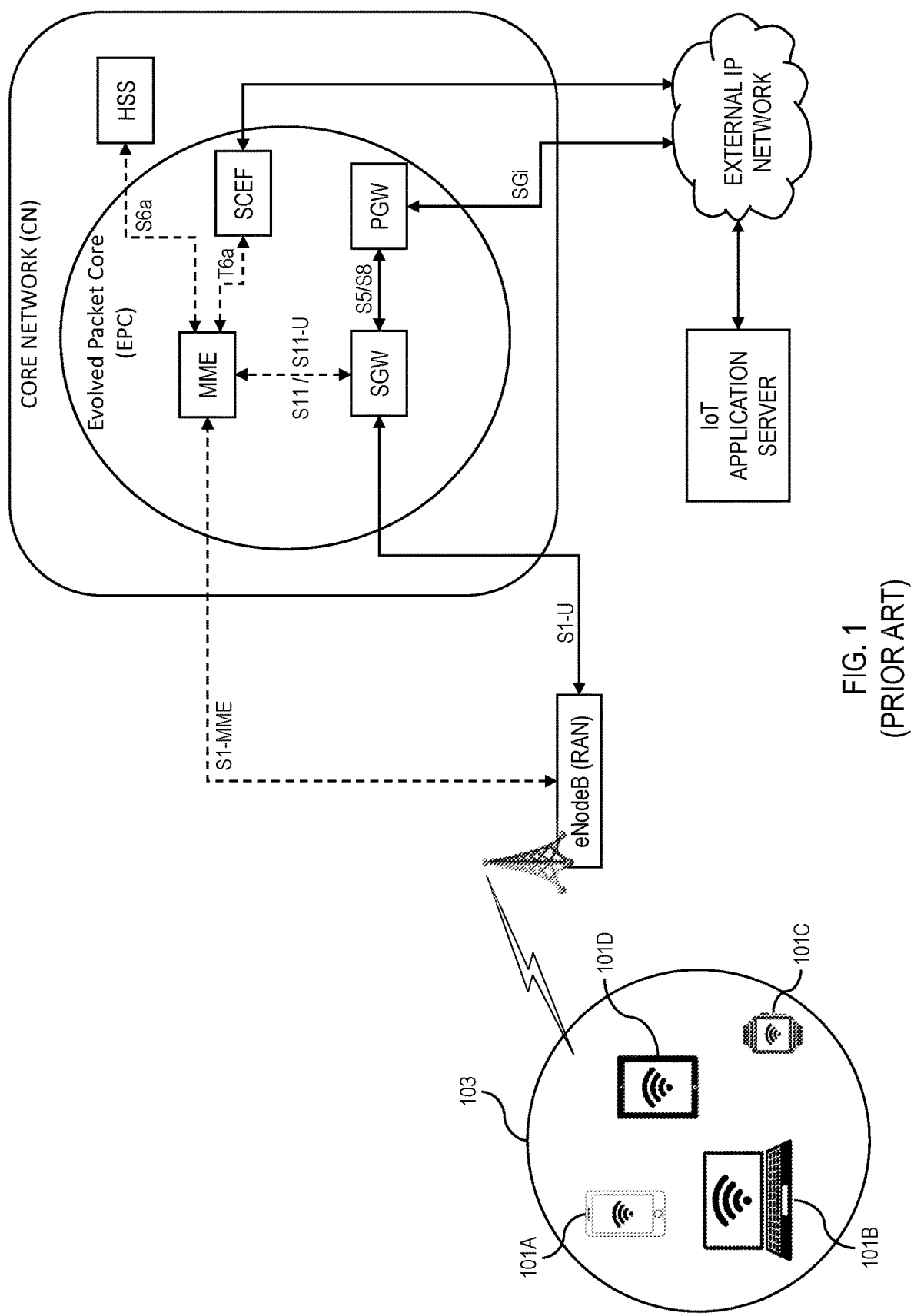
FIG. 1 illustrates a typical terrestrial wireless communications network, which includes support for narrowband IoT data communications.

Approaches for efficient transmission of Internet Protocol (IP) and Non-IP Internet of Things (IoT) data traffic over the air interface between a user terminal (UT) or user equipment (UE) and eNodeB or gateway in terrestrial wireless and satellite networks, are described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the components, methods, processes and approaches described herein may be processor-implemented using processing circuitry that may comprise one or more microprocessors, digital signal processors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Each of the following Third Generation Partnership Project (3GPP) technical specifications provide contextual background information for, and provide further details for certain elements utilized in, the example embodiments of the present invention described herein: (1) 3GPP TS 23.401, GPRS Enhancements for E-UTRAN Access, v.14.8.0, June 2018; (2) 3GPP 23.682, Architecture Enhancement to Facilitate Communications with Packet Data Network and Applications, v14.5.0, September 2017; (3) 3GPP TS 24.301, NAS Protocol for EPS, v14.8.0, June 2018; (4) 3GPP TS 36.211, E-UTRA Physical Channels and Modulation, v15.2.0, June 2018; (5) 3GPP TS 36.212, E-UTRA Multiplexing and Channel Coding, v.15.2.1, July 2018; (6) 3GPP TS 36.213, E-UTRA Physical Layer Procedures, v15.2.0, June 2018; (7) 3GPP TS 36.300, E-UTRA and E-UTRAN Overall Description, v14.1.0, December 2016; (8) 3GPP TS 36.306, UE Radio Access Capabilities, v14.6.0, March 2018; (9) 3GPP TS 36.331, E-UTRA RRC Protocol Specification, v14.8.0, September 2018; (10) 3GPP TS 36.413 51 Application Protocol, v14.1.0, January 2017.

Starting at release 13, 3GPP defines a new standard that provides access to network services to very low power Internet of Things (IoT) devices called Narrowband IoT (NB-IoT) [see 3GPP TS 36.300]. The NB-IoT communications use 180 kHz carrier bandwidth with sub-carrier 15 kHz or 3.75 kHz. The Non-Access Stratum (NAS) is also allowed to carry IoT data. Some of the LTE features (such as Guarantee Bit Rate (GBR), handover, carrier segregation, dual connectivity, emergency call and other features) are not supported for NB-IoT. The limited feature support for NB-IoT allows the low-cost manufacture of NB-IoT devices. For the NB-IoT, the IoT data can be carried by the NAS PDU message and sent over the control plane, which is called Control Plane Cellular IoT (CIoT) EPS optimization. For this scheme, the data radio bearer is not established. In the uplink direction, the MME is responsible to unpack the data from the NAS message and sends it to the IoT server. In the downlink direction, the MME packs the IoT data from the server into the NAS message and sends it to the UE. The Non-Access Stratum (NAS) is a set of protocols in the Evolved Packet System (EPS) that is used to convey non-radio signaling between the UE and the MME for LTE/E-UTRAN (Long Term Evolution/Evolved Universal Mobile Telecommunications System (UMTS) Terrestrial Radio Access Network) access. The NAS protocols perform Evolved Packet System (EPS) mobility management (maintaining connectivity and active sessions with the UE as the user moves), call control management, session management (establishing, maintaining and terminating communication links), and identity management. The Access Stratum (AS) is the functional layer below the NAS, which operates between the UE and radio network. The AS is responsible for transporting data over wireless connections and managing radio resources.

FIG. 1 illustrates a typical terrestrial wireless communications network, which includes support for narrowband IoT data communications. The NB-IoT standard supports IP and Non-IP IoT data transfer over the network. The NB-IoT is optimized for machine type traffic. For Non-IP data transfer, the IoT data can flow via the Packet Gateway (PGW) or via a Service Capability Exposure Function (SCEF) [see 3GPP TS 23.401 and 23.682]. Each of the IoT UEs 100 (UE 101A, UE 101B, UE 101C, UE 101D) communicates with the terrestrial radio access network or eNodeB that services the respective cell 103 within which the device is located at any given point in time. The eNodeB uses the S1-AP protocol on the S1-MME interface to communicate with the Mobility Management Entity (MME) for control plane traffic, and uses the GTP-U protocol on the S1-U interface to communicate with the Serving Gateway (SGW) for user plane traffic. In FIG. 1, the control plane data interfaces are depicted with dashed lines and the user plane data interfaces are depicted with solid lines.

The MME serves as the control-node for the access-network. The MME is responsible for idle mode UE paging and tagging procedures, and is involved in the radio bearer activation/deactivation process. The MME is responsible for choosing the SGW for a UE at the initial attach, and is responsible for authenticating the user by interacting with the Home Subscriber Server (HSS) for the UE. The HSS is a master user database that supports the IP multimedia subsystem (IMS) network entities that handle calls or communications sessions of a UE, which contains the subscription-related information (subscriber profiles), performs authentication and authorization of the user, and can provide information about the subscriber's location and IP information. The Non Access Stratum (NAS) signaling terminates at the MME. The MME is also responsible for the generation and allocation of temporary identities to UEs, it performs authorization checks for the UE to camp on the respective service provider's Public Land Mobile Network (PLMN), and it enforces UE roaming restrictions. The MME is the termination point in the network for ciphering/integrity protection for NAS signaling and handles the security key management. The MME also provides the control plane function for mobility between LTE and 2G/3G access networks. The MME interfaces with the HSS via the S6a interface for control plane communications (e.g., for roaming UEs), and interfaces with the Service Capability Exposure Function (SCEF) via the T6a interface (which enables transfer of non-IP data between the MME and SCEF). The SCEF was introduced in Release 13 of the 3GPP specification as an interface for small data transfers and control messaging between an Enterprise and the Operator Core Network. The SCEF provides application programming interfaces (APIs) to the Enterprise for small data transfers and control messages, and uses 3GPP-defined interfaces with the network elements in the Operator Core Network in performance of its functions.

The SGW routes and forwards user data packets, while also acting as the mobility anchor for the user plane during inter-eNodeB handovers and as the anchor for mobility between LTE and other 3GPP technologies (e.g., terminating S4 interface and relaying traffic between 2G/3G systems and the PGW). For idle state UEs, the SGW terminates the downlink data path and triggers paging when downlink data arrives for the UE. The SGW also manages and stores UE contexts (e.g., parameters of the IP bearer service), network internal routing information. The SGW communicates with the Packet Gateway (PGW) via the S5/S8 interface for user plane communications (the S5 being the internal network interface within an operator network, and the S8 is used when roaming between different network operators. The S5 interface provides user plane tunneling and tunnel management between the SGW and the PGW, and is used for SGW relocation due to UE mobility and when the SGW needs to connect to a non-collocated PGW for packet data network (PDN) connectivity. The S8 interface provides user and control plane Inter-PLMN communications between the SGW in the visiting PLMN (VPLMN) and the PGW in the home PLMN (HPLMN). The SGW also communicates with the MME via the S11 interface for control plane communications. The PGW communicates with external IP networks (such as the Internet and corporate IP networks) via the SGi interface.

Data over NAS is designed for small data transfer (e.g., IoT user data) in 3GPPsystems, utilizing the existing control signaling plane to carry small data transfers between the eNodeB and the SGW via the MME, and utilizing Signaling Radio Bearers (SRBs) to carry the data between a UE and the eNodeB. The user data is transported via the MME by encapsulating user data in NAS PDUs, which reduces the total number of control plane messages to send a short data transaction. The S11-U interface is used for IoT small data transmissions between the MME and SGW (data over NAS). The S11-U interface is based on the existing GTP-U architecture—it is a GTPv1 user plane interface and carries small data sent and received over NAS between the MME and SGW. Uplink data is transferred from the eNodeB to MME, and transferred on to the IoT server via the SGW/PGW (SGi interface) or via the SCEF, and downlink data is also transmitted over the same paths in the reverse direction.

Figure 2:
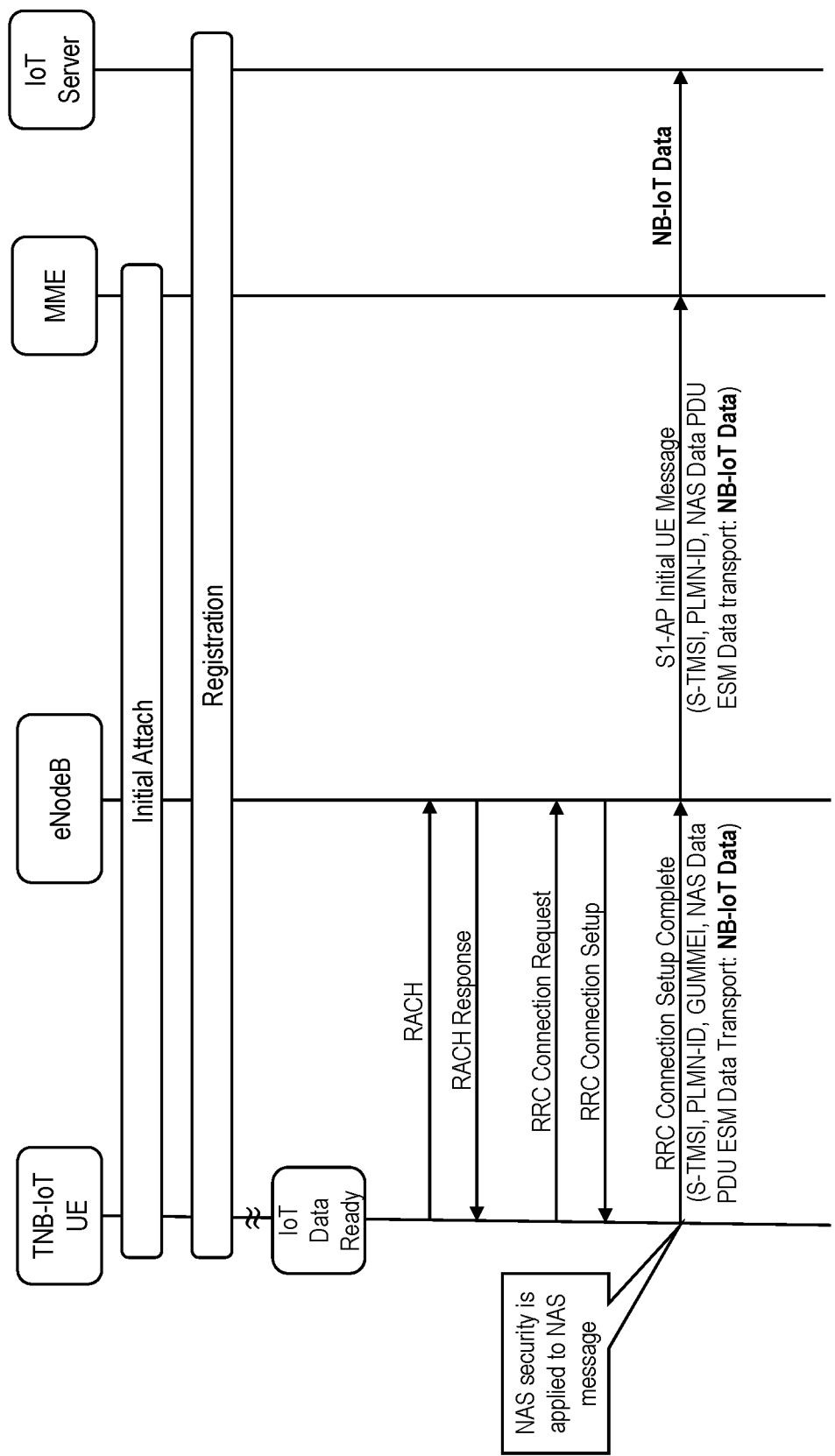
FIG. 2 illustrates the message flow of an example terrestrial Control Plane NB-IoT data transmission.

FIG. 2 illustrates the message flow of an example terrestrial Control Plane NB-IoT data transmission (for simplicity, the PGW and SCEF are omitted). The IoT data is included in the NAS Data PDU ESM Data Transport message carried by the RRC Connection setup complete message, and is passed via S11-U interface from the MME to the SGW, and then on to the IoT Server via an external IP network. As shown in FIG. 2, the data bearer is not established. The procedures are as follows.

When the Terrestrial NB-IoT UE (TNB-IoT UE) device is turned on, the UE needs to register with the network to receive subscribed services that require registration. Accordingly, at this point, the UE first performs an initial network attach process to access the network (e.g., the Core Network (CN)), and then performs a registration process, for example, to register with the IoT Applications Server. During the network attachment procedure, a default EPS Bearer is established and communications connectivity (e.g., Internet Protocol (IP) connectivity) for UE is enabled after the EPS Bearer is established. Once the IP connectivity is enables, the UE then registers with the applications server. The Attach procedure may trigger one or multiple Dedicated Bearer Establishment procedures to establish dedicated EPS bearers for the UE. The Network Attach and Registration processes are well known and documented in the art, and thus are not described in detail herein.

When IoT Data is ready for transmission, the UE sends a RACH message to the eNodeB to signal its intention to establish a radio resource connection and obtain air-interface resources, which includes a random access preamble. The eNodeB then responds with a RACH response message containing a cell Radio Network Temporary Identifier (C-RNTI), which serves as a temporary UE identifier allocated by the respective radio network controller for the cell (CRNC—e.g., the eNodeB) that is unique to the UE within the respective cell controlled by the CRNC. The then UE sends the RRC Connection request message to the eNodeB to establish a radio resource connection (e.g., the respective radio bearers) and obtain the required uplink resources. When the request is accepted, the eNodeB sends the RRC connection setup message, and the UE then responds with the RRC Connection Setup Complete message back to the eNodeB. The RRC Connection Setup Complete message includes the NAS data PDU, serving as the transport for the NAS data (e.g., EPS session management (ESM) data). In the case of an IoT user data transfer via NAS messaging (according to the respective 3GPP specifications), the UE includes the IoT data within the NAS PDU. The ESM data transport is encrypted and integrity protected using the NAS encryption algorithm and key that are negotiated during the attach procedure. Additionally, the IoT data itself might also be encrypted and integrity protected using an application layer encryption algorithm negotiated during the registration with the IoT Server. The eNodeB extracts the NAS Data PDU from the RRC Connection Setup Complete message and sends it to the MME in the S1-AP Initial UE Message. The MME extracts the IoT data from the NAS Data PDU and sends it on to the IoT Server. By way of example, the MME may encapsulate the IoT data in a data communications message according to any appropriate data communications protocol (e.g., Internet Protocol (IP)), and may transmit the message to the IoT server in accordance with an appropriate transmission layer protocol (e.g., Transmission Control Protocol (TCP) or User Datagram Protocol (UDP)). The structure and content of the RRC messages referenced in FIG. 2 is described in further detail in the 3GPP TS 36.331 specification, and the structure and content of the S1-AP Initial UE Message is described in further detail the 3GPP TS 36.413 specification.

Figure 3:
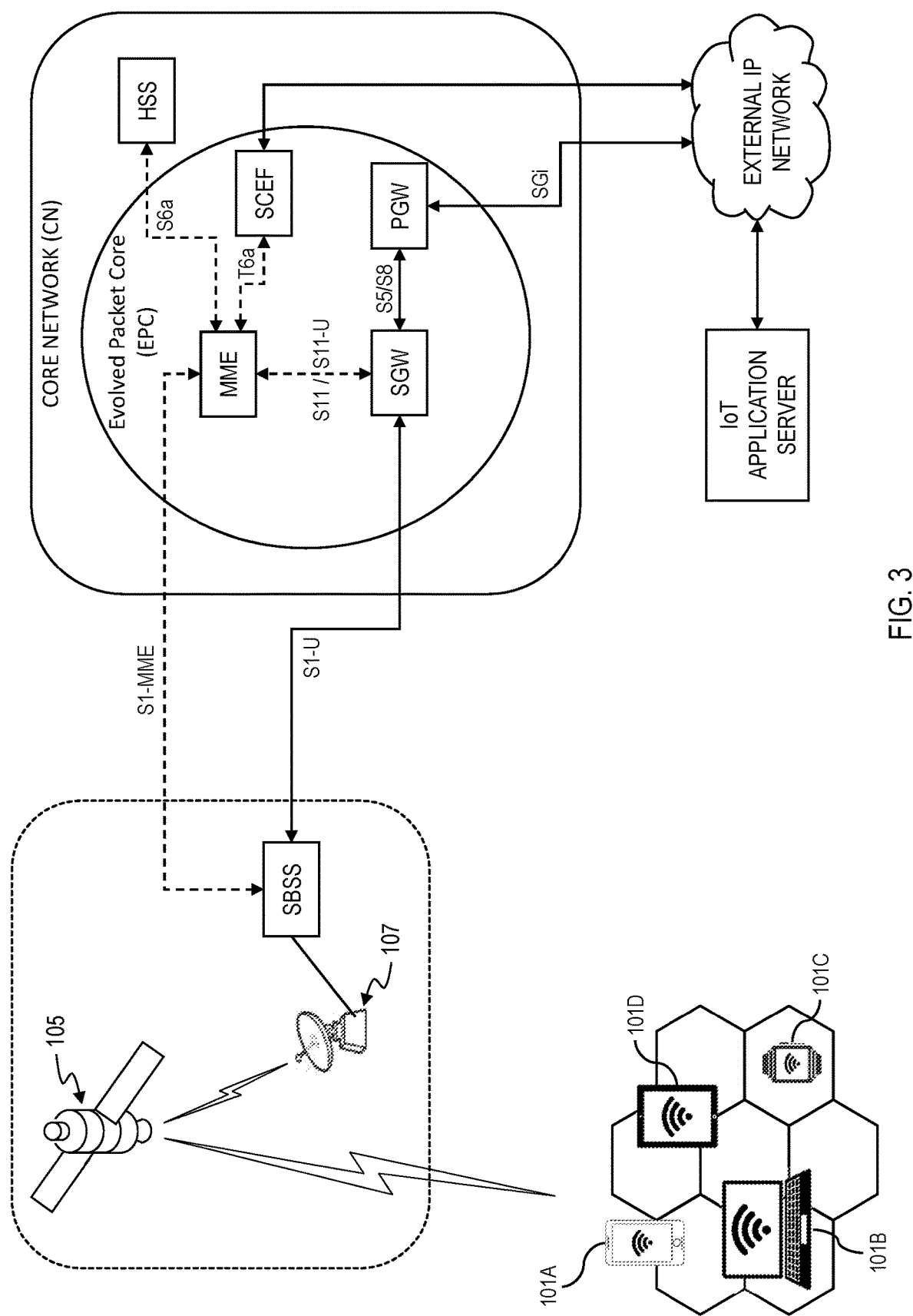
FIG. 3 illustrates an example satellite wireless communications network, including a satellite wireless access network, and which includes support for narrowband IoT data communications.

FIG. 3 illustrates an example satellite wireless communications network, including a satellite wireless access network, and which includes support for narrowband IoT data communications. In the network of FIG. 3, each of the IoT UEs 100 (UE 101A, UE 101B, UE 101C, UE 101D) communicates via the satellite access network, which includes the satellite gateway or Satellite Base Station Subsystem (SBSS), the gateway antenna system 107 and the satellite 105. As with the terrestrial eNodeB, the SBSS also uses the S1-AP protocol on the S1-MME interface to communicate with the Mobility Management Entity (MME) for control plane traffic, and uses the GTP-U protocol on the S1-U interface to communicate with the Serving Gateway (SGW) for user plane traffic. Here also, the control plane data interfaces are depicted with dashed lines and the user plane data interfaces are depicted with solid lines. The functions and interfaces of the Core Network components are the same for communications over the satellite access network (via the satellite 105) as for the terrestrial radio access network (via the eNodeB, and thus are not repeated here.

Figure 4:
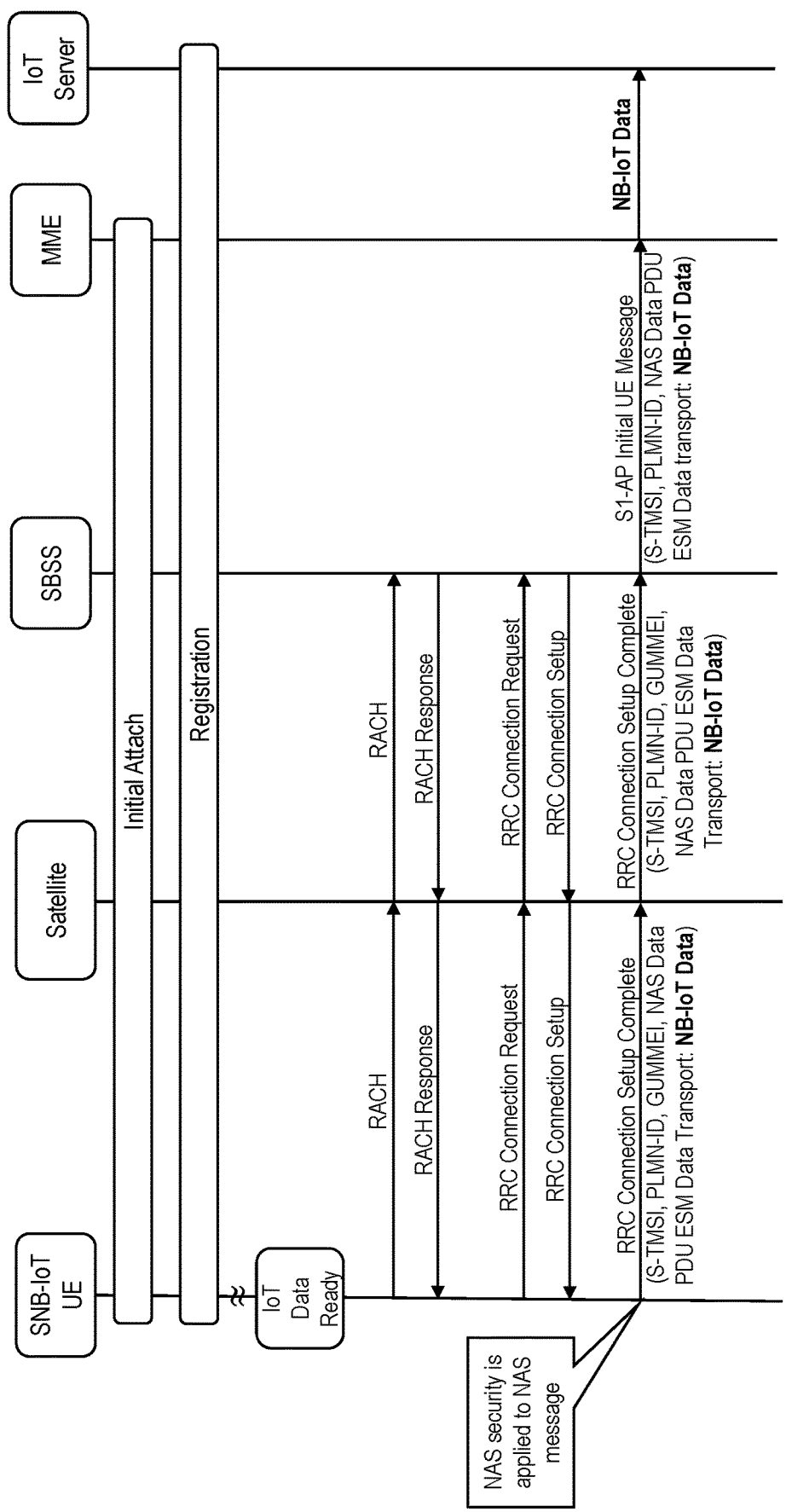
FIG. 4 illustrates the message flow of the example Control Plane NB-IoT data transmission of FIG. 2, performed via a satellite access network.

FIG. 4 illustrates the message flow of the example Control Plane NB-IoT data transmission of FIG. 2, performed via a satellite access network. The description for the message flows in FIG. 4 are similar to those for FIG. 2, except that, except that the messages between the UE (which will be referred to here as the Satellite NB-IoT UE (SNB-IoT UE) and the SBSS (which correspond to the messages between the UE and the eNodeB in FIG. 2) are relayed over the satellite. This relay of messages over the satellite, however, introduces several disadvantages, as follows: (a) The battery life of the SNB-IoT UE is significantly reduced, because the multiple transmissions of the SNB-IoT (for the RACH, RRC Request and RRC Connection Setup Complete messages) uses significant battery power, and also the SNB-IoT UE has to remain ON from the time of the transmission of the RACH message until the RRC Connection Setup Complete message is transmitted to the SBSS, which also consumes the battery power; (b) Since satellite communication systems inherently introduce a long delay for transmissions between the UE and SBSS (as compared to the transmissions between the UE and eNodeB in the terrestrial system), and thus the messaging required prior to the actual data transfer introduces significant delay which will impact the user experience; (c) The multiple satellite transmissions also consume satellite power and thus impact satellite life; (d) The multiple transmissions to and from the satellite introduce associated interference that may impact other devices in the network; and (e) The multiple transmissions impact system reliability that there are increased opportunities to experience errors.

In order to address such disadvantages, in accordance with example embodiments of the present invention, various approaches are provided to streamline the required messaging IoT data transfers, and thereby improve system efficiency and performance.

Figure 5A:
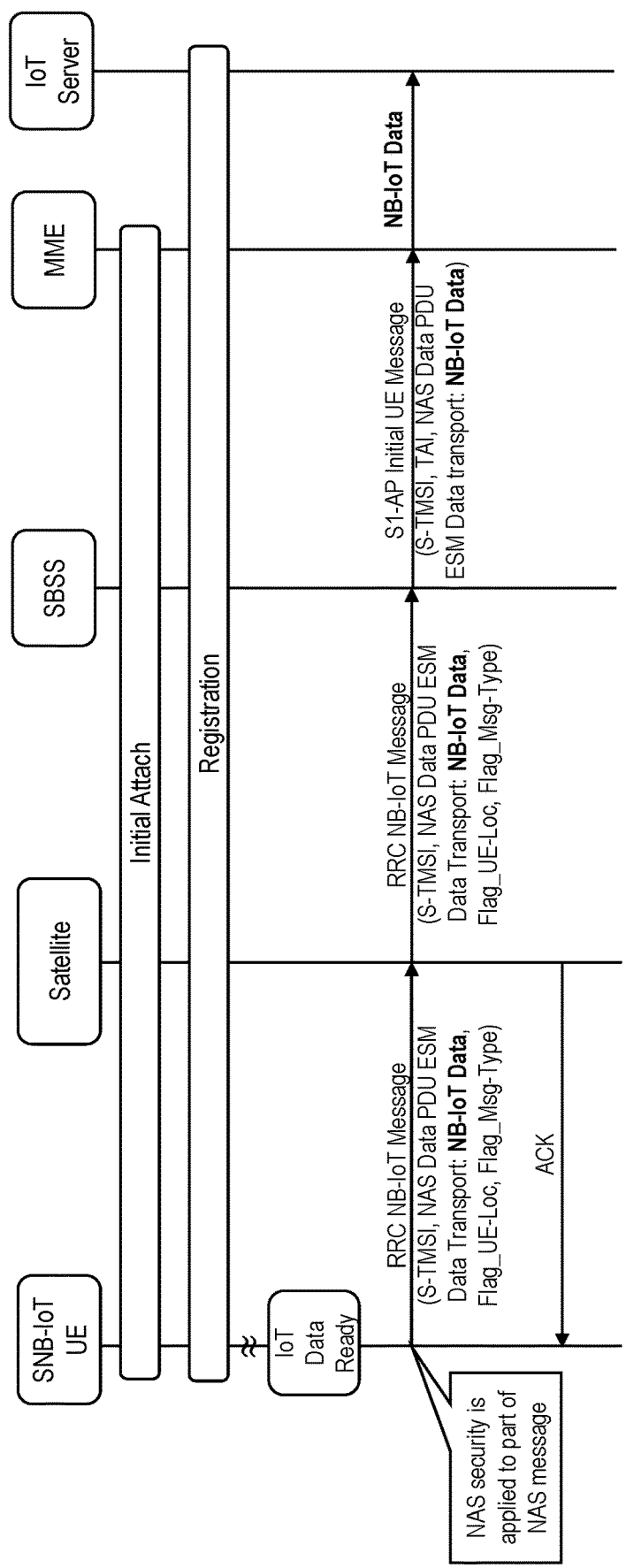
FIG. 5A illustrates the message flow for a first approach for Control Plane NB-IoT data transmission via a satellite access network, in accordance with example embodiments of the present invention.

According to one such example embodiment, FIG. 5A illustrates the message flow for a first approach for Control Plane NB-IoT data transmission via a satellite access network, in accordance with example embodiments of the present invention. By way of example, when the SNB-IoT UE initializes (e.g., at power-on), it performs the attach procedure to register with the CN. After the Attach procedure is completed, the UE then performs a registration procedure with the IoT server (e.g., an IoT Applications Server). Then, for example, if there is no IoT data ready for transmission yet the UE goes to sleep (aka enters idle mode). As soon as the SNB-IoT UE has IoT data ready for transmission send, the UE includes the IoT data in the NAS Data PDU ESM Data Transport of an initial uplink message. At this point, the UE has not been assigned or allocated a channel to transmit a NAS message with the IoT data. The channel would conventionally be obtained via the RACH and RRC setup messaging shown in FIG. 4—the RACH Message is a message on a random access channel that generally doesn't convey any information other than an indication to the eNodeB that the UE intends to, in this case, obtain a radio connection or channel (RRC) to perform some communications with the MME. In the present approach, the UE sends the initial message as a random access channel message, for example, using a slotted ALOHA or other random access or contention channel technique whereby the SBSS can acquire the message via, for example, a multi-user interference-cancellation and detection process. In FIG. 5A, this message is labeled as an RRC Narrow-Band IoT (NB-IoT) message. By way of example, the uplink message may be similar to the RRC ULInformationTransfer-NB message of the respective 3GPP standard. The ESM data transport is encrypted and integrity protected using the NAS encryption algorithm and key that are negotiated during the attach procedure. Further, the IoT data itself might also be encrypted and integrity protected using application layer encryption algorithm negotiated during the registration with the IoT Server. Accordingly, in order to identify the UE from which the message originated, the RRC NB-IoT Message includes the S-TMSI for the UE. The S-TMSI (Serving Temporary Mobile Subscriber Identity) is a temporary UE identity assigned to the UE by the Mobility Management Entity (MME) in order to uniquely identify the UE and enable the MME to access the respective UE context information. The S-TMSI is assigned for use in NAS messaging to enable the MME identify and process messages from the UE, such as to decrypt the message via the proper key and otherwise appropriately process the IoT data for the identified UE. Once the MME extracts the IoT data from the NAS PDU, the MME sends the IoT data to the IoT server either via SCEF or via PGW. The transmission the IoT data from the MME is per 3GPP standards [see 3GPP TS 23.401 and 23.682].

Further, with regard to UE location, according to the respective 3GPP standards, the MME tracks UE location via a Tracking Area Identifier (TAI). The TAI is used for various purposes, including paging the UE, admission control, billing processes, etc. For example, the TAI identifies the UE location, which in turn identifies the associated eNodeB or gateway for paging purposes. Further, the UE location is necessary to determine admission control and appropriate billing for UE sessions. For example, admission restrictions may apply when a UE is located in a particular jurisdiction, and also different billing processes may be applied depending on jurisdiction of UE location. The UE TAI is generally initially established with the MME during the Initial Attach procedures. By way of example, during the Initial Attach, the UE provides the TAI associated with its current location to the MME with the Attach Request message (e.g., the UE may obtain the TAI by first providing its current location information to the SBSS, and the SBSS in turn determines the respective TAI for that location and provides the TAI back to the UE). The MME stores the TAI in association with the respective UE, and provides the UE with a TAI List included in the Attach Accept message sent back to the UE. The TAI List identifies a list of TAIs that the UE may travel in without having to request/initiate a Tracking Area Update (TAU) process.

According to a further example embodiment, with regard to UE location, additional resource efficiencies are achieved with regard to the UE location and the respective tracking area within which the UE is located. By way of example, the UE may also include a UE location flag (Flag_UE-Loc) within the RRC NB-IoT Message that indicates whether the message includes UE location information. When the UE location has significantly changed (e.g., more than a threshold distance) from the last time that the UE reported its location to the network (e.g., since the Initial Attach procedure or the previous TAU), the UE includes new location information within the RRC NB-IoT Message, and sets the UE location flag to indicate that the message includes the new UE location information. Alternatively, if the UE has not moved, the UE sets the location flag to indicate that the message does not include new UE location information, and excludes the location information from the message. When the UE location flag is set, the SBSS extracts the new UE location information from the message, and determines the respective TAI (which may or may not be a new TAI depending on how far the UE has moved). The MME then includes the TAI within the S1-AP Initial UE Message, providing the YAI to the MME. Accordingly, the UE need only utilize the extra resources required to include the location information in the IoT message when it has moved a significant distance, and the SBSS need only check for the new UE location information when the UE location flag is set. This leaves space for more IoT data in messages that do not include updated UE location information.

According to a further example embodiment, an additional flag (Flag_Msg-Type) may be included in the RRC NB-IoT message, which indicates whether the message is a NB IoT data message or a conventional RRC connection setup procedure message. The system, for example, may serve various different types of terminals, some of which may operate conventionally with regard to the RACH and RRC connection procedures, while other IoT-type terminals may utilize the IoT data transfer approaches according to example embodiments of the present invention—and thus the SBSS needs to be able to easily determine the type of message it is receiving at any given time. As such, when the message is an RRC NB-IoT message carrying IoT data, the Flag_Msg-Type flag is set to inform the SBSS of the message type, and the SBSS will know to process the message as an IoT data message. Alternatively, when the message is a conventional RRC connection setup procedure message, the Flag_Msg-Type flag is not set, and the SBSS will know to process the message as a conventional RRC message.

Figure 5B:
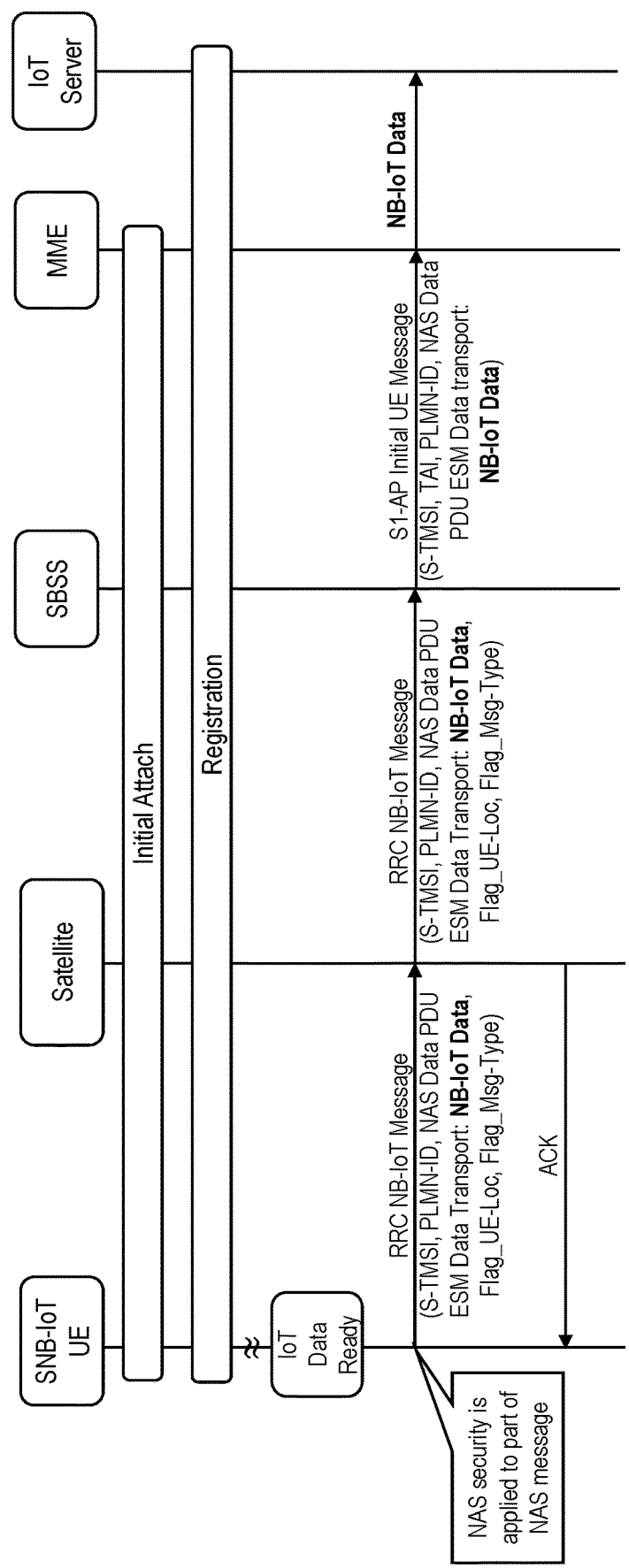
FIG. 5B illustrates the message flow for a second approach for Control Plane NB-IoT data transmission via a satellite access network, in accordance with example embodiments of the present invention.

According to a further example embodiment, FIG. 5B illustrates the message flow for a second approach for Control Plane NB-IoT data transmission via a satellite access network, in accordance with example embodiments of the present invention. The approach of FIG. 5B operates similar to the approach of FIG. 5A, except that the content of the RRC NB-IoT Message of FIG. 5A is structured similar to the ULInformationTransfer-NB message, and the content of the RRC NB-IoT Message of FIG. 5B is structured similar to the RRCConnectionSetupComp/ete-NB message, both of which are described in the 3GPP TS 36.331 specification. One difference between these two RRC messages is that the conventional ULInformationTransfer-NB does not include the S-TMSI, and thus the S-TMSI is added to the message for the approach depicted in FIG. 5A. The structure of the S1-AP Initial UE Message is described in the 3GPP TS 36.413 specification.

The approaches depicted in FIGS. 5A and 5B utilize the same overall framework for communicating IoT data between the UE and the CN via a Non-Access Stratum message. As shown in the Figures, instead of waiting to transmit the IoT data until after the RRC connection setup (as in the conventional approach for NB IoT data transfer provided by the 3GPP standards), the IoT data is immediately transmitted with an initial uplink message as soon as it is available for transmission, which eliminates the need for all the preliminary RACH and RRC connection messaging (e.g., as required by the conventional approach of FIG. 4) prior to the IoT data transmission. Hence, the approaches of such example embodiments of the present invention offer advantages over the conventional Control Plane NB-IoT data transfer over satellite, including less delay, longer expected battery life of the IoT device, less drain on satellite power and thus satellite life, less interference and increased reliability and robustness. For example, the SNB-IoT UE only uses power to transmit during the transmission of the initial RRC NB-IoT Message up to the satellite, and similarly the satellite only uses power for the transmission of this message down to the SBSS, thus significantly reducing battery drain as compared to the multiple transmissions of the approach of FIG. 4. Additionally, the single transmission incurs only a single one-way uplink and downlink transmission delay between the UE and the SBSS. Moreover, according to such example embodiments, the provided approaches do not require any changes in the standard LTE Core Network equipment, as the messaging to and from the CN is unchanged.

According to further example embodiments, additional resource efficiencies can be achieved by further limiting the data necessary for inclusion with the RRC NB-IoT Message. By way of example, the SBSS may not always require certain identifiers from the UE for proper processing of the RRC NB-IoT message and further communication of the IoT data to the proper MME—such as identification of the MME with which the UE is registered and identification of the Public Land Mobile Network (PLMN) with which the UE is subscribed. For example, a PLMN Identity (PLMN-ID) identifies the PLMN to which UE desires to connect when a cell belongs to more than a single PLMN, and a Globally Unique Mobility Management Entity Identifier (GUMMEI) identifies MME information for the MME with which the UE is registered. The GUMMEI includes is a concatenation of the PLMN-ID, MME Group Identity (MMEGI) and MME Code (MMEC) (where the MMEC identifies the MME within its group). As shown in FIGS. 3 and 4, the RRC Connection Setup Complete message typically includes the PLMN-ID and GUMMEI (although the GUMMEI is optional). The GUMMEI informs the SBSS of the MME identity to which the S1-AP Initial UE Message (including the IoT data) should be sent, and the PLMN-ID identifies the respective PLMN for the UE. In some cases, however, an SBSS may be connected to only one MME, and thus does not need to know the respective GUMMEI for a UE. Further, an SBSS may be associated with only one operator network, in which case the SBSS does not need to know the respective PLMN-ID for a UE. Accordingly, in a broadcast channel message to all of the UE's which the SBSS is serving, the SBSS may include an indicator as to whether the SBSS requires a PLMN-ID and/or a GUMMEI to be included in the RRC NB-IoT Message from the UE. Accordingly, when the SBSS does not require the GUMMEI and/or the PLMN-ID, the UE can exclude the respective information from the RRC NB-IoT Message, which thereby facilitates further resource efficiencies.

According to further example embodiments, approaches are provided for Control Plane NB-IoT data transmission via a satellite access network, using RLC Blocks to transmit multiple segments of IoT data that could not fit in a single RACH transmission. With such optimized approaches for NAS IoT data transmission, the SBSS will need to acknowledge the receipt of the data transmission without having first established an RRC connection and Access Stratum UE MAC identifier (UE-MAC-ID) or flow identifier (e.g., C-RNTI in LTE or USF in GMR1-3G). This UE MAC-ID is a UE identifier allocated by the controlling RNC (e.g., the SBSS or eNodeB) for a "cell" and is unique within the cell. The SBSS, therefore, relies on the UE identifier S-TMSI in the RRC message to acknowledge the uplink data transfer. The acknowledgment message is similar in content as the MAC contention resolution message, where it populates the UE identifier in the message and transmits it to the UE after the Random Access Response (RAR). In this case the Random Access Response doesn't provide uplink grant, but provides the temp UE MAC-ID to be used for MAC Contention resolution. While the following example embodiments are described in the context of the 3GPP Radio Link Control (RLC) protocol, the concepts of these example embodiments may be applied to any similar data-link layer type protocol that supports similar block transmissions of segmented data, such as the data-link layer, or the logical link control (LLC) and media access control (MAC) layers, of the of the Open System Interconnection (OSI) model.

Figure 6A:
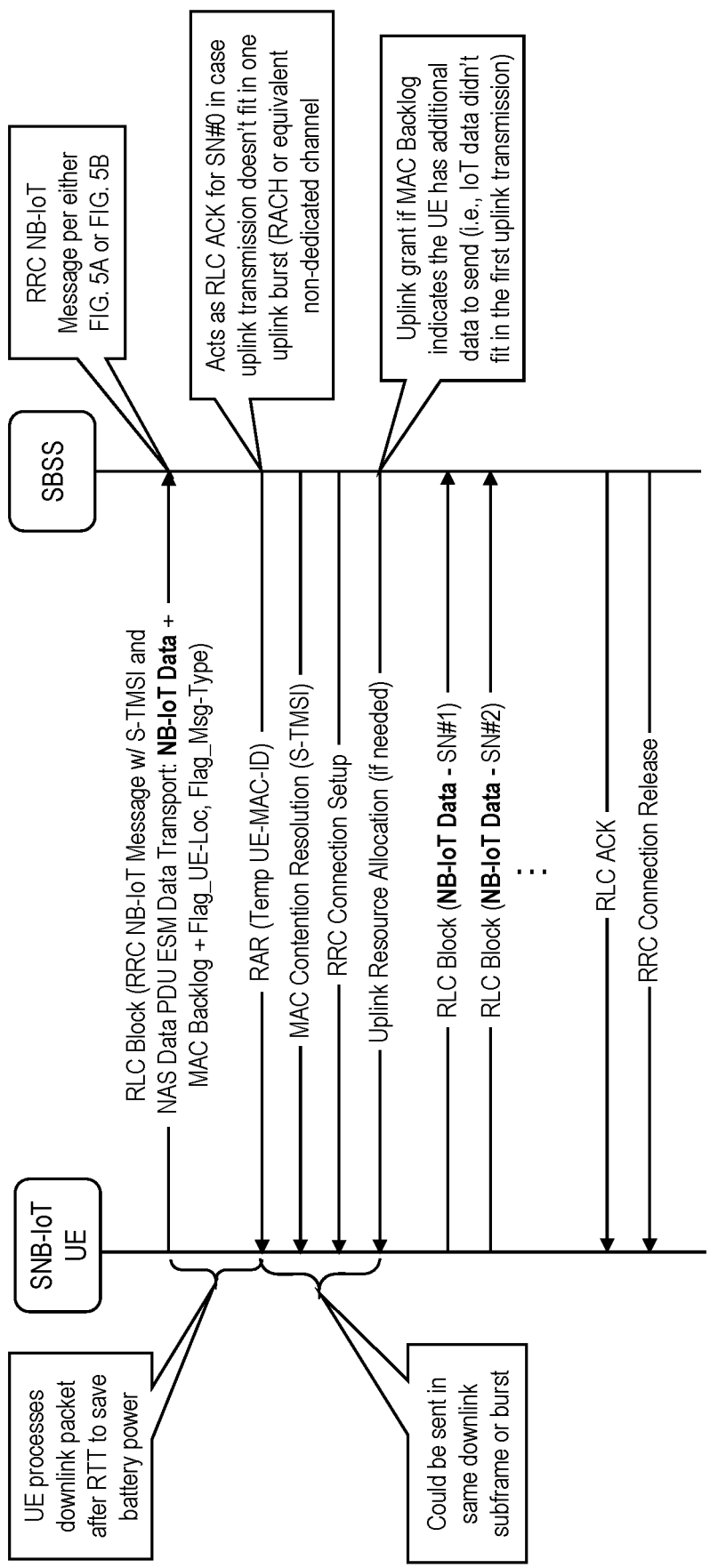
FIG. 6A illustrates the message flow for a first approach for Control Plane NB-IoT data transmission via a satellite access network, using RLC Blocks to transmit multiple segments of IoT data that could not fit in a single RACH transmission, in accordance with example embodiments of the present invention.

FIG. 6A illustrates the message flow for a first approach for Control Plane NB-IoT data transmission via a satellite access network, using RLC Blocks to transmit multiple segments of IoT data that could not fit in a single RACH transmission, in accordance with example embodiments of the present invention. If the data transmission via the RRC NB-IoT Message (via the approach of either FIG. 5A or 5B) cannot fit in one uplink transmission, the UE concatenates and segments the payload using a Radio Link Control (RLC) Block, as if the RRC connection has been already setup. The RLC Block header contains the necessary information to enable the receiver to reassemble the data from the individual segments. The UE encapsulates the RRC NB-IoT Message in an RLC Block, which includes the RRC NB-IoT Message holding a first segment of the IoT data (segment SN #0), along with a MAC Backlog identifying a backlog of additional IoT data segments that remain for transmission (e.g., like a Buffer Status Report (BSR) providing information about the amount of data available for transmission in the uplink buffers of the UE. The UE then waits for an RRC Connection Setup message and uplink grants for subsequent uplink transmissions. The SBSS responds with the RAR message, which includes the temporary UE identifier (UE-MAC-ID) for identification of subsequent uplink resource allocations for the respective UE. The UE-MAC-ID identifier differs from the S-TMSI, for example, in that the S-TMSI is the UE identifier between the UE and the CN or MME for identification of the UE within the CN, whereas the C-RNTI is for purposes of temporarily identifying the UE with the SBSS or eNodeB (within the respective "cell") for the respective radio connection. Further, the SBS sends a MAC contention resolution, which includes the S-TMSI to identify the UE whose RLC Block is being acknowledged (in case of a contention between different UE's), and serves as an acknowledgment of the first RLC block (including the IoT data SN #0). Then the RRC Connection Setup message provides the necessary identifiers for uplink and downlink allocations similar to the traditional 3GPP allocation and operation), and the Uplink Resource Allocation assigns the necessary uplink resources for the UE to transmit the remaining IoT data backlog. The UE then transmits the additional IoT data segments via further RLC Blocks, each including a sequence number identifier for the respective IoT data segment (SN #1, SN #2, . . . ) to enable reassembly of the original IoT data. The SBSS may have to decode the partial RRC messages, for example, the SBSS should decode the S-TMSI despite not fully receiving upper layer messages, and it might need to decode a partial RRC message as the message size will depend on the size of IoT payload and might not necessarily fit in an initial message, usually designed for RACH and smaller payloads. Once all of the subsequent RLC Blocks and respective IoT data segments have been received by the SBSS, the SBSS sends an acknowledgment (ACK) message and an RRC Connection Release message to the UE.

Further, the UT may enter a power-saving mode for a period (e.g., a predetermined period of time based on the round-trip time of the transmissions) after the first RLC Block transmission and prior to receipt of the RAR from the SBSS, as it takes a least one RTT before it will receive the response. The UE knows for sure that the RAR will not be received prior to a given minimum period of time based on the round-trip time to and from the satellite, and thus can enter the power-saving mode for that given minimum time period, and wake up in time to receive the RAR. Additionally, a receive window may be configured in the UE and advertised after which the uplink data transmission would be considered as lost if no RAR is received. Utilizing the power saving mode after the initial transmission results in additional battery saving for the UE IoT device.

Figure 6B:
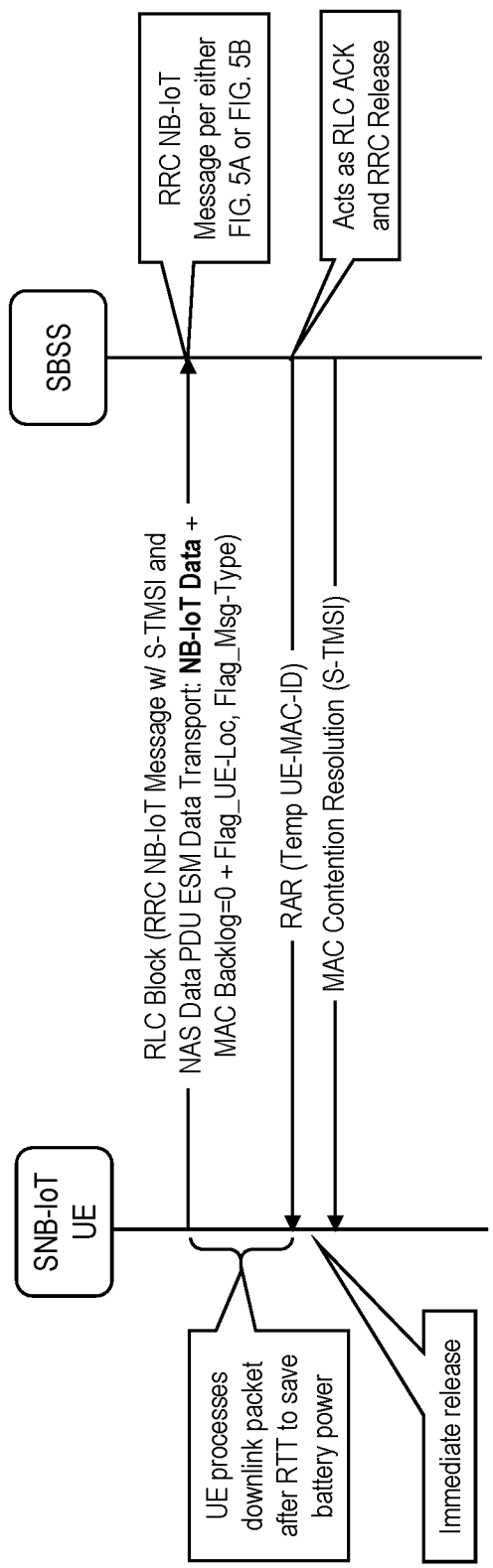
FIG. 6B illustrates the message flow for the Control Plane NB-IoT data transmission via a satellite access network of FIG. 6A, where the IoT data transmission is completed in the first RLC Block transmission, in accordance with example embodiments of the present invention.

FIG. 6B illustrates the message flow for the Control Plane NB-IoT data transmission via a satellite access network of FIG. 6A, where the IoT data transmission is completed in the first RLC Block transmission, in accordance with example embodiments of the present invention. In this case, the MAC Backlog=0, and the RAR serves as the RLC Block acknowledgment and the RRC connection release.

Figure 6C:
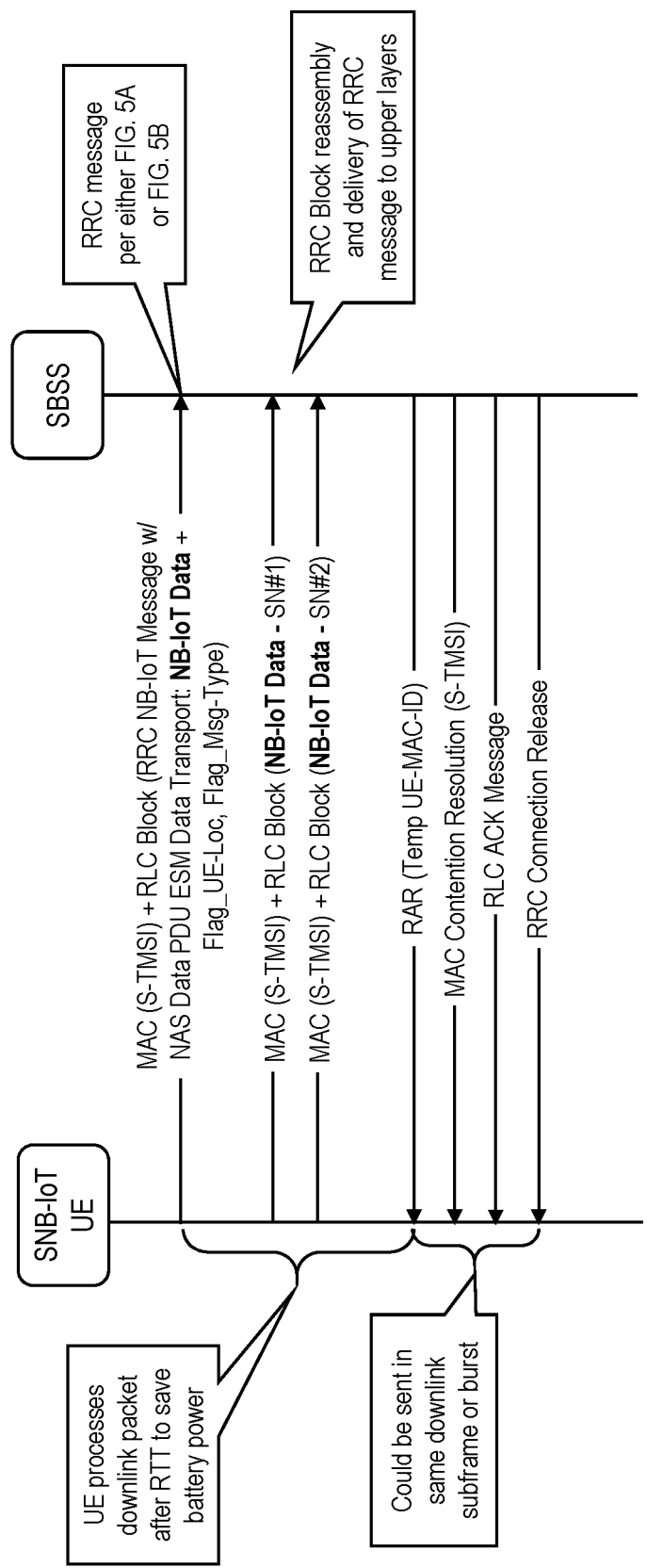
FIG. 6C illustrates the message flow for a second approach for Control Plane NB-IoT data transmission via a satellite access network, using a RACH for sequential RLC Blocks to transmit multiple segments of IoT data that could not fit in a single RACH transmission, in accordance with example embodiments of the present invention.

FIG. 6C illustrates the message flow for a second approach for Control Plane NB-IoT data transmission via a satellite access network, using a RACH for sequential RLC Blocks to transmit multiple segments of IoT data that could not fit in a single RACH transmission, in accordance with example embodiments of the present invention. In this approach, consecutive RLC Block IoT data transmissions are sent using a RACH channel or equivalent non-dedicated channel, without SBSS intervention or resource allocation or scheduling. In this case, the UE encapsulates each RLC Block message with a MAC header that provides the UE S-TMSI to identify the respective UE to the SBSS with each message, so the SBSS can identify the stream of IoT data coming from the same UE. The new MAC header or control message will indicate and identify the UE by the S-TMSI for each RLC Block message (the S-TMSI is used here, because the UE has no temporary identifier with the SBSS, without having received the RAR and the MAC contention resolution. Further, because the UE is sending the multiple sequential transmissions on a non-dedicated channel, the SBSS needs to distinguish the stream of messages from the one UE from other messages that may be received on that channel from other UE's. Whereas, in the approach of FIG. 6A, the UE identifier is not needed in subsequent RLC Block transfers, because the SBSS knows (based on the resource allocation) that the respective transmissions are from that UE. After receiving all the RLC blocks from the same UT, the SBSS re-assembles the IoT data using the existing RLC reassembly mechanism and delivers it to the upper layers. The SBSS then acknowledges the RLC Blocks via the RAR, MAC Contention Resolution, RLC ACK Message and RRC Connection Release.

As with the approaches of FIGS. 5A and 5B, the approaches of FIGS. 6A, 6B and 6C for sequential transmission of IoT data segments also cuts down on the number of required transmissions by again eliminating the initial access communications, and also provides an acknowledgment mechanism. As shown in the Figures, in these approaches also, instead of waiting to transmit the IoT data until after the RRC connection setup (as in the conventional approach for NB IoT data transfer provided by the 3GPP standards), the IoT data is immediately transmitted with an initial uplink message as soon as it is available for transmission, which eliminates the need for all the preliminary RACH and RRC connection messaging (e.g., as required by the conventional approach of FIG. 4) prior to the IoT data transmission. Further, in the approach of FIG. 6C, multiple sequential segments of IoT data are transmitted without waiting for receipt of uplink resource grants for the transmissions. Hence, the approaches of such example embodiments of the present invention also offer advantages over the conventional Control Plane NB-IoT data transfer over satellite, including less delay, longer expected battery life of the IoT device, less drain on satellite power and thus satellite life, less interference and increased reliability and robustness. For example, the SNB-IoT UE only uses power to transmit during the transmission of the RLC Block messages carrying the RRC NB-IoT Messages and the respective IoT data segments up to the satellite, and similarly the satellite only uses power for the transmission of these message down to the SBSS, thus significantly reducing battery drain as compared to the multiple transmissions of the approach of FIG. 4. Additionally, the single transmission incurs only a single one-way uplink and downlink transmission delay between the UE and the SBSS. Moreover, according to such example embodiments, the provided approaches also do not require any changes in the standard LTE Core Network equipment, as the messaging to and from the CN is unchanged.

As would be recognized by one of ordinary skill in the art, the terrestrial wireless communications network of FIG. 1 may include multiple wireless access networks, each covering a respective area (e.g., a geographic area on the surface of the Earth) servicing multiple UE's, and each being serviced by one or more base stations (e.g., eNodeB's). Similarly, the wireless communications network of FIG. 3 may include multiple satellite wireless access networks, each covering a respective area (e.g., a geographic area on the surface of the Earth) servicing multiple UE's. Each satellite wireless access network may include one or multiple satellites being serviced by multiple base stations (e.g., satellite gateways or SBSS's), and the one or multiple satellites may be geosynchronous earth orbit (GEO), medium earth orbit (MEO) or low earth orbit (LEO) satellites, or a combination thereof. Further, the multiple wireless access networks of each of FIGS. 1 and 3 may interface with one or multiple core networks, each of which may connect to multiple applications servers via one or more external IP networks. Further, each core network may include multiple MME's, multiple SGW's, multiple PGW's multiple SCEF's and multiple HSS's, and may support services of multiple Public Land Mobile Networks respectively operated by one or more network operators. Further, such a wireless communications network of either of FIG. 1 or FIG. 3 may include multiple terrestrial wireless access networks in combination with one or multiple satellite wireless access networks.

Moreover, although the foregoing example embodiments are described with respect to efficient control plane IoT data transfer over a satellite access network of a data communications system, the same approaches can be applied for narrowband user data transfers (such as IoT data transfers) via the control plane in any data communications system including one or more wireless access networks, including terrestrial mobile communications systems (e.g., terrestrial cellular systems, such as LTE systems or the like), data communications systems including other wireless access networks (e.g., high altitude platform wireless access networks, or other wireless access networks employing airborne wireless communications platforms).

Figure 7:
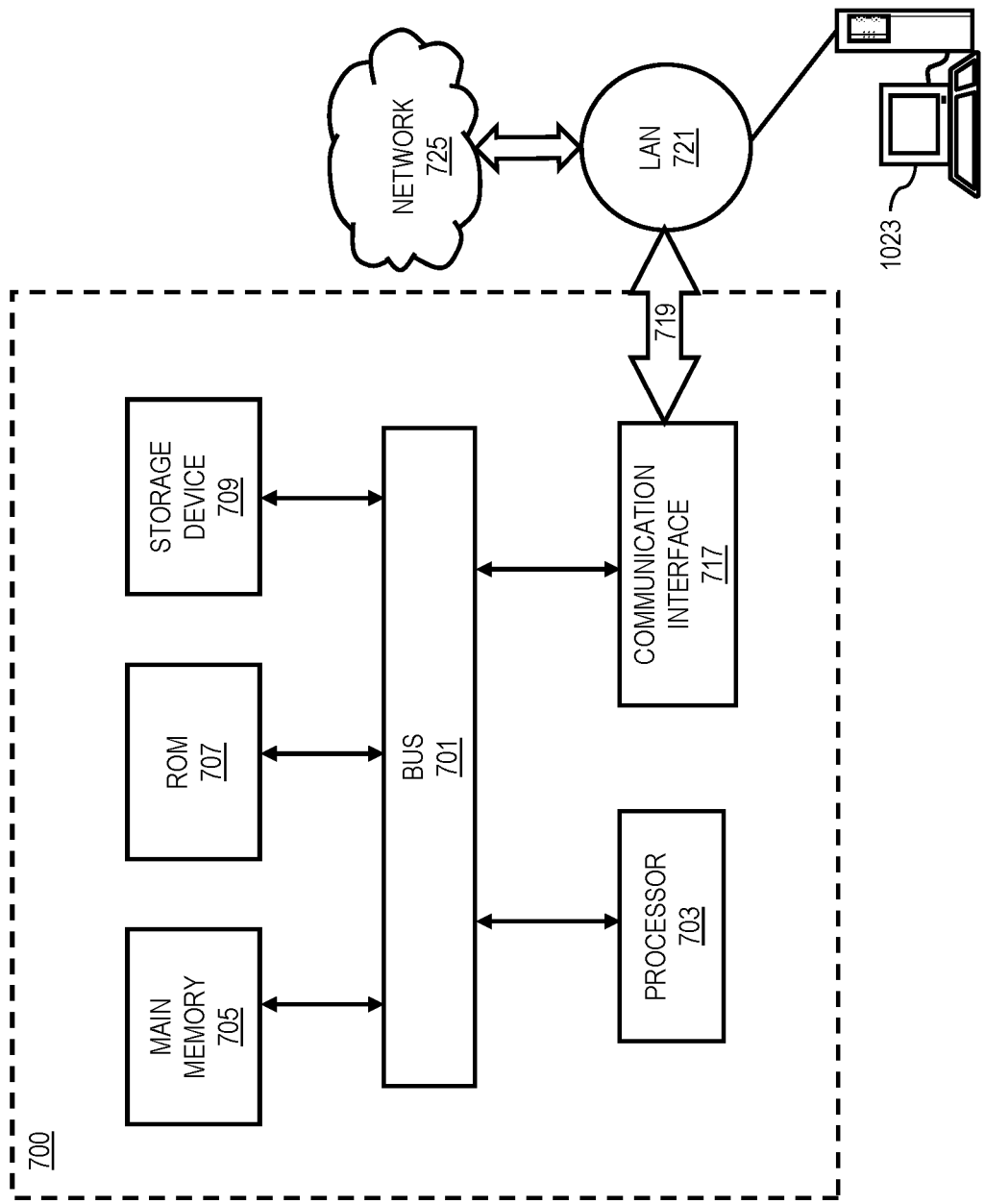
FIG. 7 illustrates a computer system, whereby one or more of which may be configured to respectively implement different aspects of example embodiments of the present invention.

FIG. 7 illustrates a computer system, whereby one or more of which may be configured to respectively implement different aspects of example embodiments of the present invention. The computer system 700 may include a bus 701 or other communication mechanism for communicating information, and one or more processors 703 (of which one is shown in the Figure) coupled to the bus for processing information. The computer system may also include a memory 705, such as a random access memory (RAM) or other dynamic storage device, coupled to the bus for storing information and instructions to be executed by the processor(s). The memory can also be used for storing temporary variables or other intermediate information during execution of instructions to be executed by the processor(s). The computer system may further include a read only memory (ROM) 707 or other static storage device coupled to the bus for storing static information and instructions for the processor(s). The computer system may further include a storage device 709, such as a magnetic disk or optical disk, additionally coupled to the bus for storing information and instructions.

According to one embodiment of the invention, approaches in accordance with example embodiments are provided by the computer system 700 in response to the processor(s) executing an arrangement of instructions contained in the memory. Such instructions can be read into the memory from another computer-readable medium, such as the storage device. Execution of the arrangement of instructions causes the processor(s) to perform the process steps and/or device functions or operation described herein. One or more processors in a multi-processing arrangement may also be employed to execute the instructions. In alternative embodiments, hard-wired circuitry is used in place of or in combination with software instructions to implement such embodiments of the present invention. Thus, embodiments of the present invention are not limited to any specific combination of hardware circuitry and software.

The computer system may also include a communication interface 717 coupled to the bus. The communication interface may provide two-way data communications, for example, coupling to a network link 719 connected to a local network 721. The network link may provide data communication through one or more networks to other data devices. For example, the network link may provide a connection through local network to a host computer 723, which has connectivity to a network 725 (e.g. a wide area network (WAN) or the Internet) or to data equipment operated by one or more service providers.

Figure 8:
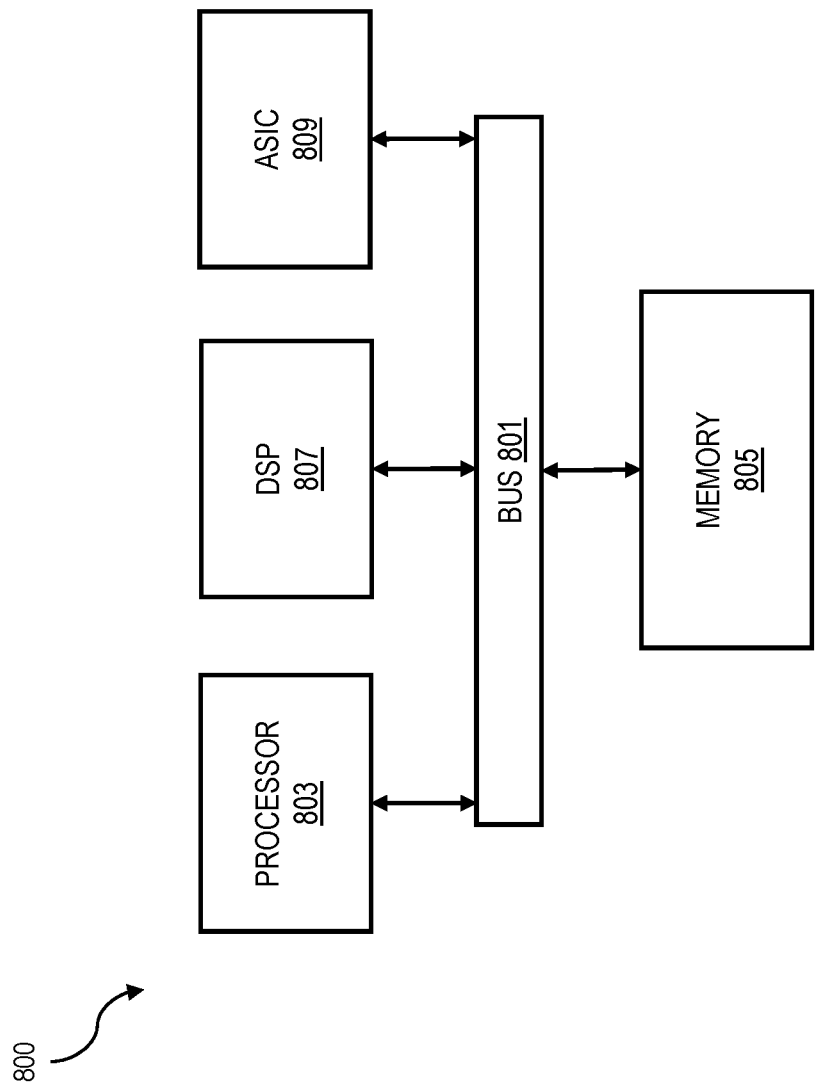
FIG. 8 illustrates a block diagram of a chip set, one or more of which may be configured to respectively implement different aspects of example embodiments of the present invention.

FIG. 8 illustrates a block diagram of a chip set, one or more of which may be configured to respectively implement different aspects of example embodiments of the present invention. The chip set 800 includes, for instance, processor and memory components described with respect to FIG. 8 incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions/programs and process information stored in, for example, a memory 805. The processor 803 may include one or more processing cores with each core configured to perform independently. A multi-core processor enables multiprocessing within a single physical package, such as two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, and/or one or more application-specific integrated circuits (ASIC) 809. A DSP 807 typically is configured to process real-time signals (e.g., sound or video) in real time independently of the processor 803. Similarly, an ASIC 809 can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 803 and accompanying components have connectivity to the memory 805 via the bus 801. The memory 805 may include both dynamic memory (e.g., RAM) and static memory (e.g., ROM) for storing executable instructions that, when executed by the processor 803 and/or the DSP 807 and/or the ASIC 809, perform the process of example embodiments as described herein. The memory 805 may also store the data associated with or generated by the execution of the process.

Further, the functionality of the example embodiments of the present invention may be provided by the chip set 800, in response to the processor 803 executing an arrangement of program instructions contained in memory 805. Execution of the program instructions contained in memory 805 causes the processor 803 to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A data communications system, comprising:
a data communications device (DCD); and
at least one wireless access network, comprising a base station; and
wherein the DCD is configured to generate a narrowband message which includes user-plane data of the DCD, and
wherein the DCD is configured to transmit the narrowband message to the base station via a random access control-plane channel of the wireless access network, prior to any request for or establishment of a radio resource connection, or establishment of any dedicated radio bearers or wireless channels, between the DCD and the base station.

2. The data communications system according to claim 1, further comprising:
a network management entity; and
wherein the base station is configured to generate a DCD message including the user-plane data of the DCD, and to transmit the DCD message to the network management entity.

3. The data communications system according to claim 2, further comprising:
one or more applications servers; and
wherein the network management entity is configured to generate a DCD server message including the user-plane data of the DCD, and to transmit the DCD server message to at least one of the one or more applications servers.

4. The data communications system according to claim 2, wherein:
the DCD is configured to include location information in the narrowband message which indicates a current location of the DCD, and to include a DCD location flag in the narrowband message which indicates that the narrowband message includes the location information.

5. The data communications system according to claim 4, wherein:
the base station is configured to determine that the narrowband message includes the location information based on the DCD location flag, and to include a location identifier in the DCD message transmitted to the network management entity, wherein the location identifier reflects the current location of the DCD.

6. The data communications system according to claim 2, wherein:

the DCD is configured to include a DCD identifier in the narrowband message which is a DCD identity assigned to the DCD during an initial DCD registration procedure; and
the base station is configured to include the DCD identifier in the DCD message transmitted to the network management entity, wherein the inclusion of the DCD identifier in the DCD message to the network management entity serves to indicate that the user-plane data included in the DCD message originated from the DCD.

7. The data communications system according to claim 1, wherein:
the DCD is configured to include a message-type flag in the narrowband message which indicates that the narrowband message includes the user-plane data of the DCD; and
the base station is configured to distinguish the narrowband message from at least one other message, each received over the random access control-plane channel of the wireless access network from a respective other DCD, which does not include user-plane data of the respective other DCD.

8. A data communications device (DCD) for a data communications system, comprising:
one or more processors; and
a transceiver configured to transmit and receive wireless data communications to and from a base station of the data communications system; and
wherein the one or more processors is/are configured to generate a narrowband message including user-plane data of the DCD,
wherein the one or more processors is/are configured to control the transceiver to transmit the narrowband message to the base station via a random access control-plane channel of a wireless access network of the data communications system, prior to any request for or establishment of a radio resource connection, or establishment of any dedicated radio bearers or wireless channels, between the DCD and the base station.

9. The DCD according to claim 8, wherein:
the one or more processors is/are configured to include a message-type flag in the narrowband message which indicates that the narrowband message includes the user-plane data of the DCD; and
one or more processors is/are configured to include the message-type flag in the narrowband message to enable the base station to distinguish the narrowband message from one or more other messages, which may be received by the base station over the random access control-plane channel of the wireless access network from at least one respective other DCD, and which does not include user-plane data of the at least one respective other DCD.

10. The DCD according to claim 8, wherein:
the one or more processors is/are configured to include location information in the narrowband message which indicates a current location of the DCD, and to include a device location flag in the narrowband message which indicates that the narrowband message includes the location information.

11. The DCD according to claim 8, wherein:
the one or more processors is/are configured to include a device identifier in the narrowband message which is a device identity assigned to the DCD during an initial registration procedure; and one or more processors is/are configured to include the device identifier in the narrowband message for use as an identifier to associate the user-plane data included in the DCD message with the DCD.

12. The DCD according to claim 8, wherein:
the one or more processors is/are configured to encapsulate the narrowband message in a data-link protocol block message; and
the one or more processors is/are configured to include a backlog flag in the narrowband message which indicates whether a transmission buffer of the DCD contains further of the user-plane data of the DCD awaiting transmission to the base station.

13. The DCD according to claim 12, wherein, when the transmission buffer of the DCD contains the further user-plane data of the DCD awaiting transmission to the base station:
the one or more processors is/are configured to await receipt, via the transceiver, of an acknowledgment message from the base station; and
upon receipt of the acknowledgment message, the one or more processors is/are configured to generate one or more further data-link protocol block messages, each including a respective segment of the further user-plane data of the DCD awaiting transmission to the base station, and a sequence number indicating a relative position of the respective segment with respect to an original configuration of the user-plane data of the DCD, and to control the transceiver to transmit each of the one or more further data-link protocol block messages to the base station.

14. The DCD according to claim 13, wherein:
the one or more processors is/are configured to receive, via the transceiver, an uplink resource allocation message from the base station; and
the one or more processors is/are configured to control the transceiver to transmit each of the one or more further data-link protocol block messages to the base station via wireless uplink resources allocated to the DCD in accordance with the uplink resource allocation message.

15. The DCD according to claim 12, wherein:
the one or more processors is/are configured to control the DCD to enter a power-saving mode for a predetermined time period after the transmission of the narrowband message to the base station.

16. A method for data communications in a data communications system, comprising:
generating, by a data communications device (DCD), a narrowband message including user-plane data of the DCD; and
transmitting, by the DCD, the narrowband message to a base station via a random access control-plane channel of a wireless access network of the data communications system, prior to any request for or establishment of a radio resource connection, or establishment of any dedicated radio bearers or wireless channels, between the DCD and the base station.

17. The method according to claim 16, wherein:
the narrowband message includes a message-type flag which indicates that the narrowband message includes the user-plane data of the DCD; and
the message-type flag is included in the narrowband message to enable the base station to distinguish the narrowband message from one or more other messages, which may be received by the base station over the random access control-plane channel of the wireless access network from at least one respective other DCD, and which does not include user-plane data of the at least one respective other DCD.

18. The method according to claim 16, wherein:
the narrowband message includes location information which indicates a current location of the DCD, and includes a device location flag which indicates that the narrowband message includes the location information.

19. The method according to claim 16, wherein:
the narrowband message includes a device identifier which is a device identity assigned to the DCD during an initial registration procedure; and
the device identifier is included in the narrowband message for use as an identifier to associate the user-plane data included in the DCD message with the DCD.

20. The method according to claim 16, wherein:
the narrowband message is encapsulated in a data-link protocol block message; and
the narrowband message includes a backlog flag which indicates whether a transmission buffer of the DCD contains further of the user-plane data of the DCD awaiting transmission to the base station.

21. The method according to claim 20, wherein, when the transmission buffer of the DCD contains the further user-plane data of the DCD awaiting transmission to the base station, the method further comprises:
receiving, by the DCD, an acknowledgment message from the base station; and
upon receipt of the acknowledgment message, generating one or more further data-link protocol block messages, each including a respective segment of the further user-plane data of the DCD awaiting transmission to the base station, and a sequence number indicating a relative position of the respective segment with respect to an original configuration of the user-plane data of the DCD, and transmitting each of the one or more further data-link protocol block messages to the base station.

22. The method according to claim 21, further comprising:
receiving, by the DCD, an uplink resource allocation message from the base station; and
transmitting each of the one or more further data-link protocol block messages to the base station via wireless uplink resources allocated to the DCD in accordance with the uplink resource allocation message.

23. The DCD according to claim 20, wherein:
the DCD enters a power-saving mode for a predetermined time period after the transmission of the narrowband message to the base station.

* * * * *